(12) United States Patent
Buedenbender

(10) Patent No.: US 8,459,018 B2
(45) Date of Patent: Jun. 11, 2013

(54) HYDRODYNAMIC TORQUE CONVERTER

(75) Inventor: Christine Buedenbender, Buehlertal (DE)

(73) Assignee: Schaeffler Technologies AG & Co. KG, Herzogenaurach (DE)

(*) Notice: Subject to any disclaimer, the term of this patent is extended or adjusted under 35 U.S.C. 154(b) by 917 days.

(21) Appl. No.: 12/574,358

(22) Filed: Oct. 6, 2009

(65) Prior Publication Data
US 2010/0089713 A1 Apr. 15, 2010

(30) Foreign Application Priority Data
Oct. 9, 2008 (DE) .......... 10 2008 051 114

(51) Int. Cl.
F16H 41/26 (2006.01)
(52) U.S. Cl.
USPC ........ 60/361; 416/197 C

(58) Field of Classification Search
USPC .......... 60/345, 361; 416/180, 197 C, 223 R, 416/243
See application file for complete search history.

(56) References Cited

U.S. PATENT DOCUMENTS

| 4,180,978 | A  | * | 1/1980  | Maddock | 60/345 |
| 6,216,454 | B1 | * | 4/2001  | Tsuzuki | 60/362 |
| 6,266,958 | B1 | * | 7/2001  | Sasse et al. | 60/362 |
| 6,860,102 | B2 | * | 3/2005  | Kim et al. | 60/361 |
| 7,083,381 | B2 | * | 8/2006  | Shue | 60/361 |
| 7,152,399 | B2 | * | 12/2006 | Schweitzer et al. | 60/361 |
| 2005/0247054 | A1 | * | 11/2005 | Goerend | 60/361 |

* cited by examiner

Primary Examiner — Thomas E Lazo
(74) Attorney, Agent, or Firm — Simpson & Simpson, PLLC

(57) ABSTRACT

A hydrodynamic torque converter with a pump, a turbine and a stator, having an increased thickness on the suction side of blade profiles of blades in the stator relative to the pressure side of the blades, in order to reduce the pump torque of the torque converter at low to medium speed ratios without influencing the other features of the characteristic diagram.

12 Claims, 4 Drawing Sheets

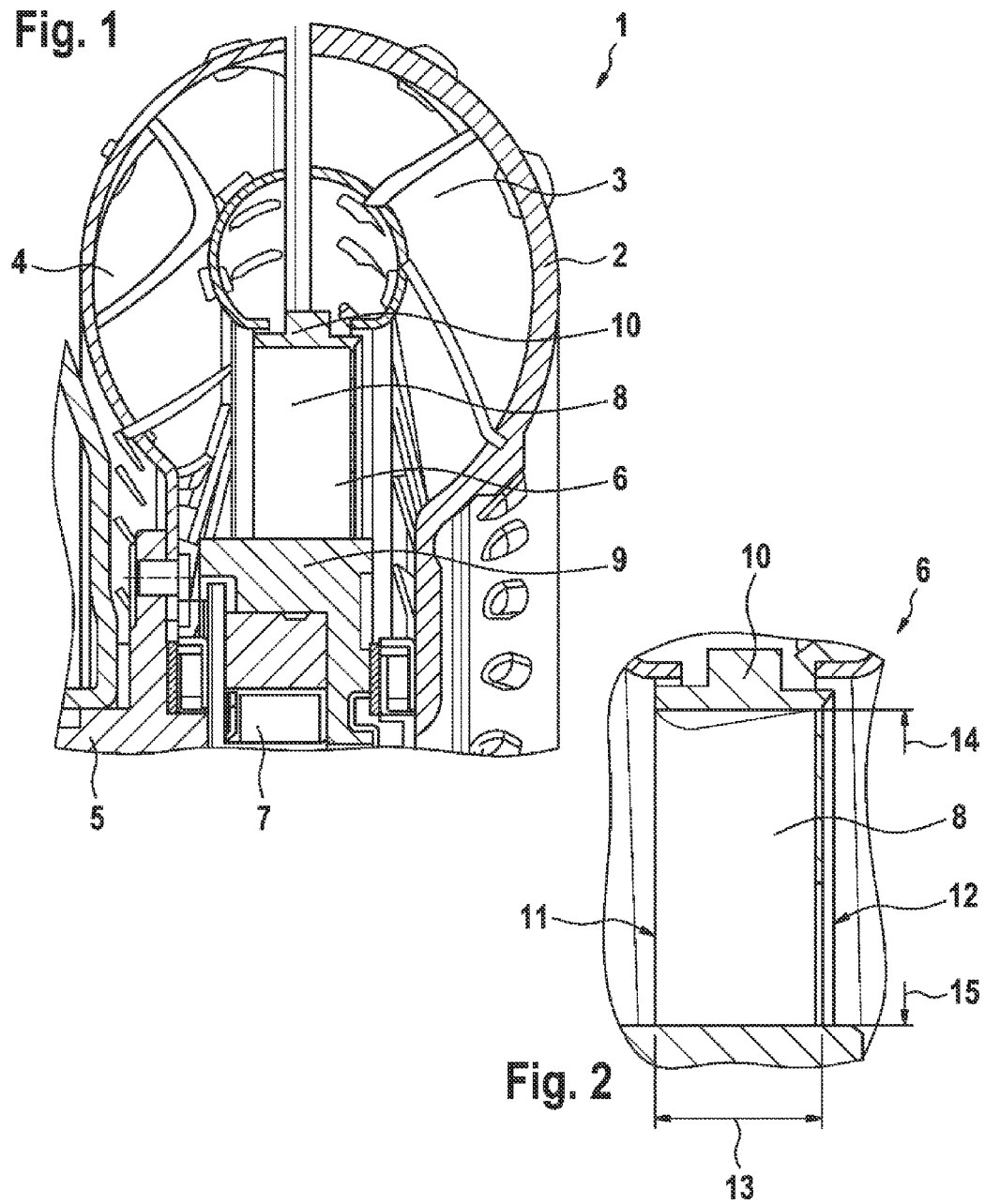

HYDRODYNAMIC TORQUE CONVERTER

CROSS-REFERENCE TO RELATED APPLICATIONS

This patent claims priority of German Patent Application No. 10 2008 051 114.5, filed on Oct. 9, 2008, which application is incorporated herein by reference.

FIELD OF THE INVENTION

The invention relates to a hydrodynamic torque converter with a pump, a turbine and a stator.

BACKGROUND OF THE INVENTION

Such torque converters have been known as startup elements in motor vehicle drive trains for a long time. Thus, a torque transferred by a drive unit through the converter housing to the pump is transferred to the turbine by means of an operating medium. Thus, a torque augmentation is produced by the stator, when a speed difference exists between the pump and the turbine (nT<nP), as the stator is supported through a freewheeling clutch in one direction of rotation against the housing and is rotatable in the other direction of rotation. For this purpose, the stator comprises radially extending blades disposed at regular intervals about the circumference of the stator, which control the flow of the operating medium. Thus, as a function of a speed based slippage between the pump and the turbine, the flow resistance of the operating fluid at the stator is supported at the housing through the freewheeling clutch, and a torque augmentation is generated at the output side of the torque converter, while the freewheeling clutch of the stator is overrun as a function of the changed flow conditions at high speed ratios.

Thus, it has become evident for some types of torque converters, that a torque curve of the torque converters determined over the pump speed is unbalanced in an undesirable manner, since e.g. an undesirable rise of the torque occurs at low drive speeds and at low to medium speed ratios.

Thus, it is the object of the invention to provide an improved torque curve without changing the other design parameters for adjusting the torque properties of the torque converter.

BRIEF SUMMARY OF THE INVENTION

The object is accomplished by a hydrodynamic torque converter with a pump and with a turbine, driven by the pump, and a stator disposed between the pump and the turbine and supported at the housing in one direction of rotation by a freewheeling clutch, the stator comprising a blading with blades extending from a diameter of the stator hub to an outer diameter of the stator with a concave profile between a leading edge and a trailing edge at a pressure side and a convex profile at a suction side, wherein the convex profile is disproportionally cambered relative to the concave profile in a center portion, along a meridional length between the leading edge and the trailing edge.

This way, the shape of the blade is configured, so that flow properties according to the invention are provided, wherein the profiles are characterized according to NACA-profiles by a pressure side profile and a suction side profile, and a camber line, which connects the points of equal distance from the two opposite profile points over the longitudinal extension of the blade. A meridional length of the blade characterizes its axial extension with respect to the axis of rotation of the stator. Based on convex and concave profiles evenly and proportionally extending over the meridional length, the camber line extends substantially parallel to the concave profile at least in a center portion offset from the leading edge and from the trailing edge. This indicates a proportional progression of the cambers of the convex and concave profiles over the meridional length. Contrary to that, it is provided according to the invention to provide additional material in the center portion of the convex profile, and to thicken the profile in this portion, so that the camber of the convex profile of the suction side increases disproportionally compared to the concave profile on the pressure side. This causes the camber line to deviate from the approximately parallel alignment with the concave profile in the center portion due to the over-proportional camber of the convex profile, thus the camber line is quasi distorted compared to the concave profile. Such a thickening of the blades at the suction side causes the flow resistance at the stator to increase, in particular at higher speed ratios between the pump and the turbine, due to an increased angle of attack of the operating medium, so that a reduced torque capacity of the pump is caused under these conditions, thus a lowering of the characteristic curve of the converter is achieved. This leads overall to a more uniform torque characteristic of the torque converter, thus to a more uniform characteristic diagram of the torque converter, without having to change the design of the pump or the turbine, so that a cost effective adaptation can be performed by changing the stator alone.

The center thickened portion is preferably located between 30% and 80% of the meridional length, starting at the leading edge. In a preferred embodiment, the center portion is disposed at 40% to 70% of the meridional length starting at the leading edge.

The profile of the blades over the meridional length, thus in axial direction parallel to the rotation axis of the stator, can be expressed as the distribution of the blade angle of the camber line, and by the distribution of the blade thickness over the meridional length. Thus, the angle of the tangent of the camber line in the respective point is referenced. Herein, it has e.g. proven advantageous when the blade angle of the camber line of an initial portion between the leading edge and the beginning of the center portion changes by 0° to ±20°. This means that the change of the blade angle of the initial portion to the beginning of the center portion is comparatively small, and can e.g. decrease from an initial angle of 95° to 75° at the beginning of the center portion, or it can increase to an angle of 115° at the beginning of the center portion, or can assume all values there between. In a preferred embodiment, an angle of e.g. 95° can be maintained substantially over the initial portion. Contrary to that, the center portion comprises a strong increase of the blade angle distribution of the camber line over the meridional length, so that with an initial angle between 70° and 110°, which is a function of the end point of the initial portion, angles between 140° and 160°, can e.g. be provided at the end point of the center portion. Furthermore, the convex profile of the blades can be configured approximately straight in an end portion adjacent to the center portion, so that tangents at the initial portion and at the end portion intersect in the center portion enclosing an angle between 55° and 75°.

Besides the blade angle distribution, the thickness distribution of the meridional length is relevant for the desired profile thickness increase. Based on an initial thickness at the profile leading edge, the thickness increases approximately in a linear manner in the initial portion. The thickness reaches its maximum in the center portion, which can be punctiform or can be a plateau, and it then decreases approximately in a linear manner to the thickness of the trailing edge.

Advantageously provided embodiments of blades comprise a gradient of a blade angle of the camber line in the initial portion between the leading edge and the center portion between −0.5° and 0.5° per percent of length increase of the meridional length. Accordingly, a gradient of the blade angle in the center portion is greater or equal to 1.5° per percent of length increase of the meridional length. The extreme increase of the blade angle of the camber line is thus caused almost in its entirety by the disproportionally increased camber of the convex profile, while the development of the convex profile does not contribute excessively to the extreme increase of the camber line. The profile on the pressure side rather evolves in a known manner.

Said considerations respectively relate to a predetermined diameter. The characteristics of the blades and thus the characteristics of the profiles can be varied over the blade or stator diameter according to the invention depending on the requirements concerning the stator and its embedding into the torque converter. Thus, the convex profiles can be varied over the diameter with the concave profiles preferably remaining unchanged over the diameter. For example, in a simple advantageous embodiment of the stator, the increased thickness of the center portion of the convex profile can be maintained over the entire diameter of the blades. In other embodiments, the blade angles of the camber line, the gradients of the blade angle distribution and/or the cambers of the convex profile, in particular of its center portion, can be varied over the diameter. Thus, the blades can have a profile with increased thickness of the center portion at a certain inner diameter, and from there the over-proportional camber of the center portion regresses into a proportional camber of the convex profile relative to the concave profile with increasing diameter. Contrary to that, an embodiment of a stator can comprise blades, which have a profile with increased thickness of the center portion at a certain exterior diameter, and from there the over-proportional camber of the center portion regresses into a proportional camber of the convex profile relative to the convex profile with decreasing diameter.

These and other objects and advantages of the present invention will be readily appreciable from the following description of preferred embodiments of the invention and from the accompanying drawings and claims.

BRIEF DESCRIPTION OF THE DRAWINGS

The nature and mode of operation of the present invention will now be more fully described in the following detailed description of the invention taken with the accompanying drawing figures, in which:

FIG. 1 shows a partial sectional view of a torque converter;
FIG. 2 shows a partial sectional view of a stator.

DETAILED DESCRIPTION OF THE INVENTION

Figure 3:
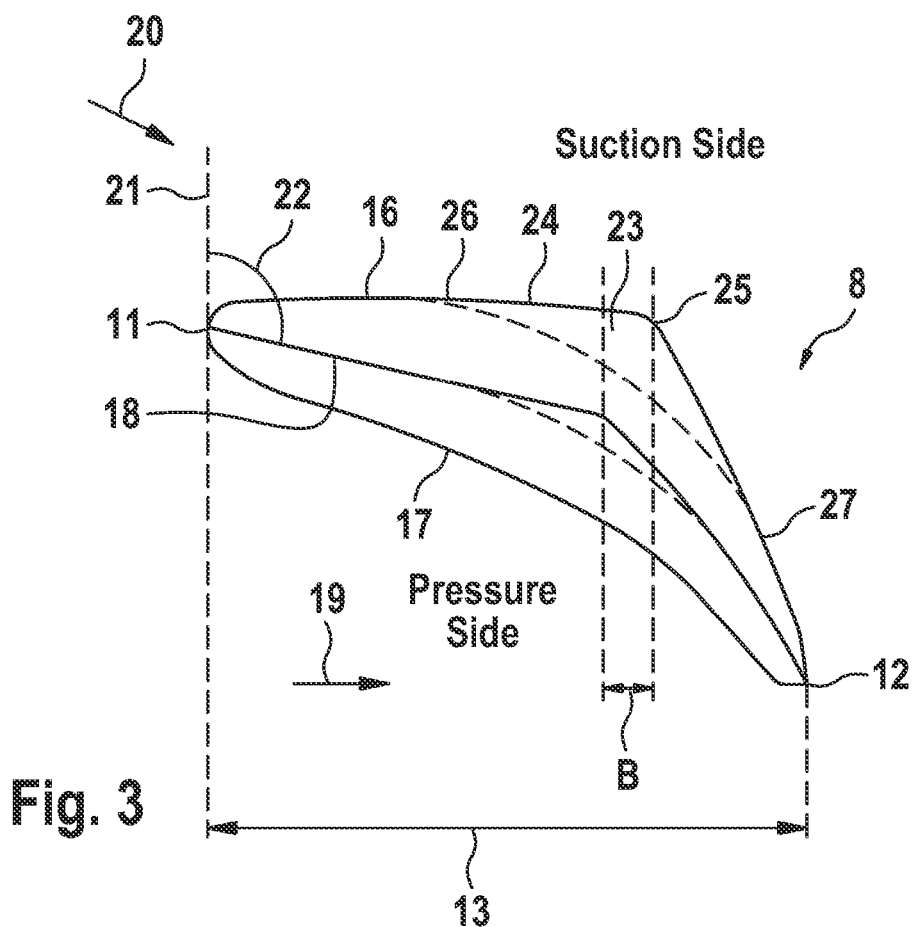
FIG. 3 shows a profile cross section of a blade of a stator.

At the outset, it should be appreciated that like drawing numbers on different drawing views identify identical, or functionally similar, structural elements of the invention. While the present invention is described with respect to what is presently considered to be the preferred aspects, it is to be understood that the invention as claimed is not limited to the disclosed aspects.

Furthermore, it is understood that this invention is not limited to the particular methodology, materials and modifications described and as such may, of course, vary. It is also understood that the terminology used herein is for the purpose of describing particular aspects only, and is not intended to limit the scope of the present invention, which is limited only by the appended claims.

Unless defined otherwise, all technical and scientific terms used herein have the same meaning as commonly understood to one of ordinary skill in the art to which this invention belongs. Although any methods, devices or materials similar or equivalent to those described herein can be used in the practice or testing of the invention, the preferred methods, devices, and materials are now described.

FIG. 1 shows a hydrodynamic torque converter 1 in a partial sectional view, wherein only the upper half of the torque converter 1 disposed about the rotation axis is illustrated. The housing 2 is driven by a drive unit and includes the pump 3. In one embodiment, a separation clutch is provided between the housing 2 and the pump 3, so that the pump can be decoupled from the housing 2, e.g. with the drive unit operating at idle.

The torque converter 1 is filled with operating fluid, so that the turbine is coupled through the operating medium for a rotation of the pump 3 and driven by said pump. The torque transmitted to the turbine 4 is transmitted through the turbine hub 5 to a transmission input shaft which is not shown. In order to bridge the pump and the turbine, a converter lockup clutch can be operatively disposed between the housing 2 and the turbine hub 5. A torsional vibration damper can be provided between the converter lockup clutch and the turbine hub 5 and/or between the turbine 4 and the turbine hub 5.

The stator 6 is disposed axially between the turbine 4 and the pump 3 and is rotatable in one direction of rotation through the freewheeling clutch 7, and rotationally fixed in the opposite direction of rotation over a stator shaft, which is fixated at the housing. The stator 6 controls the flow of the operating medium as a function of the speed ratio between the pump 3 and the turbine 4. The flow force of the operating medium is supported e.g. at lower and medium speed ratios at the stator 6, and thus leads to a torque conversion and to a torque augmentation. For this purpose, the stator 6 comprises radially extending blades 8 distributed about the circumference at an even distance from one another and disposed between a stator hub 9 and a radially outer race 10.

FIG. 2 shows the stator 6 of FIG. 1 in a partial sectional view. The blades 8 respectively comprise a leading edge 11 facing the turbine and a trailing edge 12 facing the pump. The axial extension of the blades 8 of the stator 6 is thus determined by the meridional length 13. The effective diameter of the blades 8 is a function of the outer diameter 14 defined by the outer race 10 and the inner diameter 15 defined by the stator hub 9.

FIG. 3 shows one of the blades 8 disposed in the stator 6 of the FIGS. 1 and 2 in a cross section on the inner diameter 15. Typical prior art blades coincide with the blade 8 except the portions between the dashed lines and the solid lines. Accordingly, the blade 8 is comprised of a convex profile 16 on the suction side of the stator and a concave profile 17 on the pressure side of the stator as known from profiles for aerodynamic applications. The meridional length 13 extends between the leading edge 11 and the trailing edge 12. Respective equal distances between the convex profile 16 and the concave profile 17 define the camber line 18. The arrow 19 indicates the direction of the rotation axis of the stator 6 (FIG. 1), the arrow 20 shows the flow direction of the operating medium in an operating range which is characterized by large speed ratios.

The blade angle 22 of the camber line 18 is thus defined relative to the tangent at the respective points. The blade angles 22 together with the thickness distribution over the meridional length 13 thus characterize the extension of the blade 8 and of its profiles 16, 17 respectively.

Based on a typical prior art blade, the convex profile 16 (dashed) and the concave profile 17, in particular in the center portion B, extend approximately in parallel to one another. This means that the camber line 18 (dashed) also extends in particular in the center portion B approximately parallel to the concave profile 17. In order to be able to increase the flow resistance on the suction side at higher angles of attack and thus to provide a more homogenous characteristic curve through a flatter torque curve without changing the blading of the pump 3 and the turbine 4 (FIG. 1), the blade 8 is modified compared to the dashed portions of a prior art blade by providing the convex profile 16 with a thickening 23, which leads to a camber increase 24 of the convex profile 16. The convex profile 16 in the configuration according to the invention is similar to a wedge profile with an edge 25, which is more or less pronounced, with approximately straight arms 26, 27 adjacent thereto including an angle between 55° and 75° at the edge 25. Thus, the arm 26 can be disposed substantially parallel to the axis of rotation.

Figure 4:
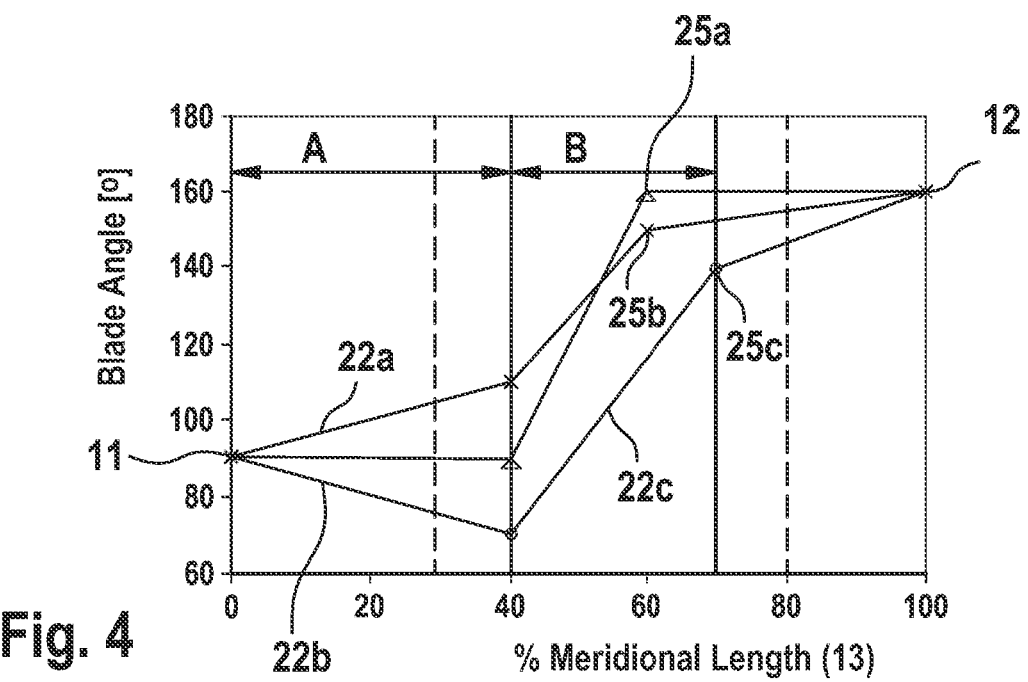
FIG. 4 shows a diagram for illustrating blade angle distributions over the meridional length for different blades.

The camber increase 24 performed with the concave profile 17 remaining unchanged leads to a distortion of the camber line 18 based on the higher percentages of the convex profile 17, which cause different blade angles 22 over the meridional length compared to the prior art. Thus, FIG. 4 shows a diagram in which three embodiments with different blade angles 22a, 22b, 22c are plotted as a function of the percentage meridional length 13 (FIG. 3). The meridional length is thus divided into a center portion B with 40% to 70% of the meridional length and into an initial portion A, wherein a possible enlargement of the center portion between 30% and 80% of the meridional length is indicated by dashed vertical lines. The initial portion A begins at the input edge 11 and ends at the center portion B. The blade angles 22a, 22b, 22c develop starting from an angle of e.g. 95° in the initial portion A slightly increasing (22a), slightly decreasing (22c) or constant (22b) until the beginning of the portion B and rise form there with a much greater slope, and then from the edge 25a, 25b, 25c have a slight increase again up to the trailing edge 12 at 100% of the meridional length.

Figure 5:
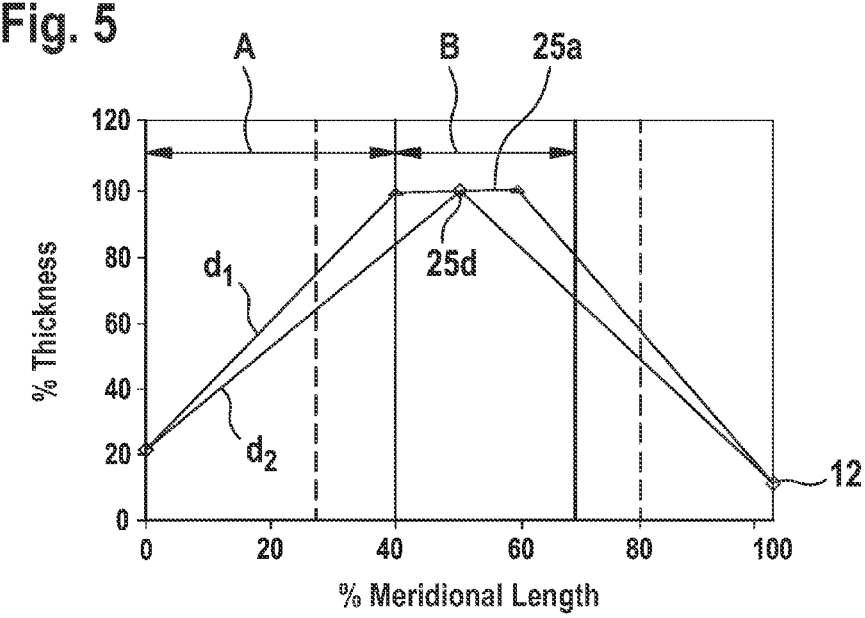
FIG. 5 shows a diagram for illustrating blade thickness distributions over the meridional length for various blades.

FIG. 5 shows a diagram of two possible thickness distributions $d_1$ and $d_2$ of embodiments of blades similar to the blade 8 of FIG. 3 along the meridional length. Thus, the thickness shown as a percentage refers to the thickness of the blades at the edge 25d, 25e. This means that the blades of both thickness distributions have the same thickness at the edge 25d, 25e. The thicknesses $d_1$, $d_2$ continuously rise in the initial portion A and reach their maximum in the portion B. After exceeding the edge 25d, 25e, the thicknesses $d_1$, $d_2$ decrease again towards the trailing edge 12. The edge 25d of the thickness $d_1$ is thus sharp and the edge 25e of the thickness $d_2$ is configured plateau shaped.

Figure 6:
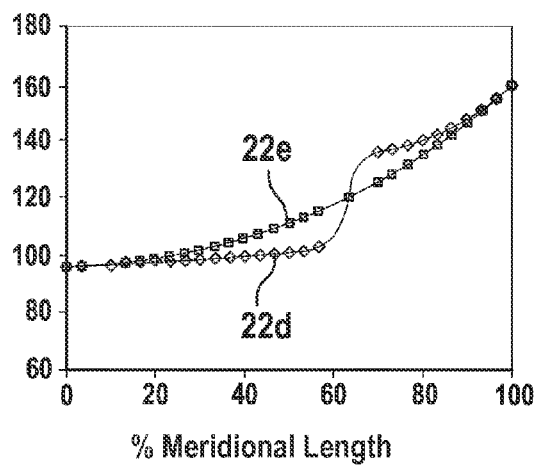
FIG. 6 shows a diagram for illustrating blade angle distributions over the meridional length of a blade according to the invention and a prior art blade.
Figure 7:
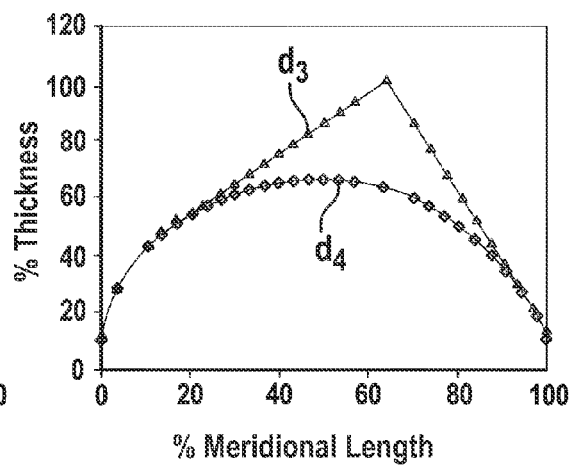
FIG. 7 shows a diagram for illustrating blade thickness distributions over the meridional length of a blade according to the invention and a prior art blade.

The FIGS. 6 and 7 illustrate the nonlinear blade angle distribution 22d and the nonlinear thickness distribution $d_3$ respectively of a blade similar to the blade 8 of FIG. 3 compared to the blade angle distribution 22e and the thickness distribution $d_4$ of a prior art blade with a convex suction side profile and a concave pressure side profile without thickening or camber increase of the convex profile along the percentage meridional length.

Figure 8:
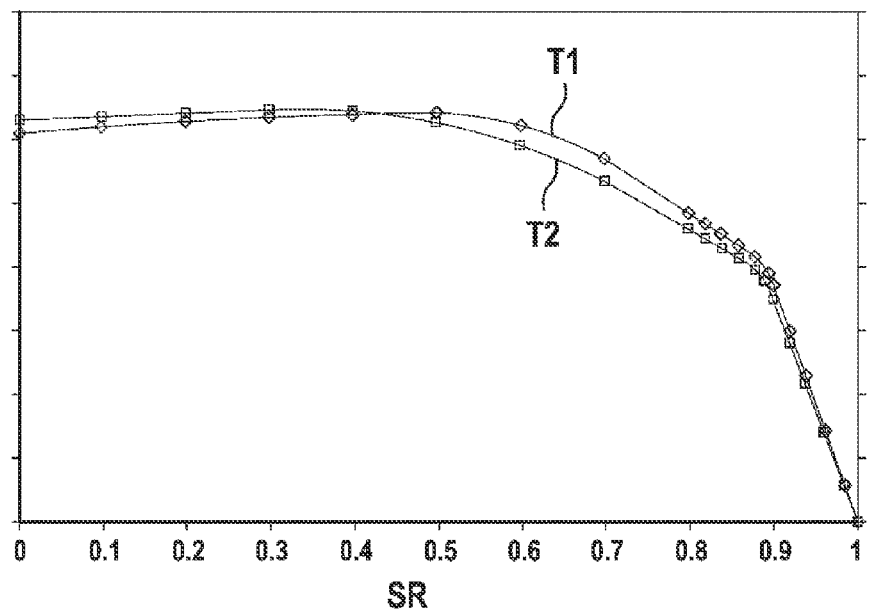
FIG. 8 shows a diagram for illustrating the torque properties of a torque converter with a stator according to the invention and a prior art stator.

FIG. 8 shows the torque curves T1 and T2 of the torque converter 1 of FIG. 1 as a function of the speed ratio SR between the pump and the turbine. Thus, the torque curve T1 shows the torque properties of a torque converter with a conventional stator and the torque curve T2 shows the torque properties of a torque converter with a stator with thickened blades. The torque curve T1 shows a torque increase at speed ratios SR from 0 to 0.6. In order to configure the torque curve more evenly, the blades are thickened at the convex profiles, so that a flow resistance is established in said range of the speed ratios, which leads to the lowering of the torque curve T2 relative to the torque curve T1 and thus to a more even torque curve.

Figure 9:
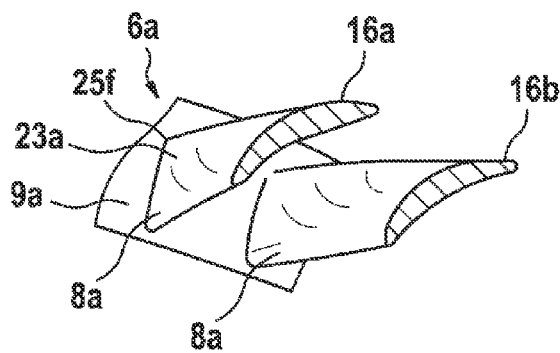
FIG. 9 shows a detail of a stator with a blade profile which varies over the diameter.
Figure 10:
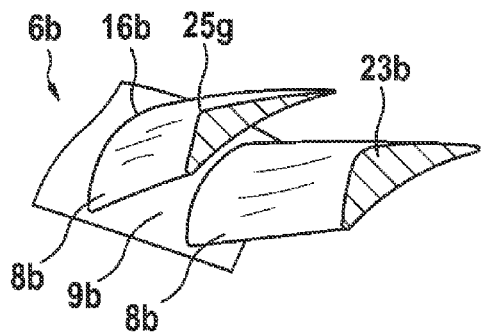
FIG. 10 shows a detail of a stator with a blade profile that varies over the diameter as an alternative to the stator of FIG. 9; and,
FIG. 11 shows a detail of a stator with a profile that is thickened over the entire diameter.
Figure 11:
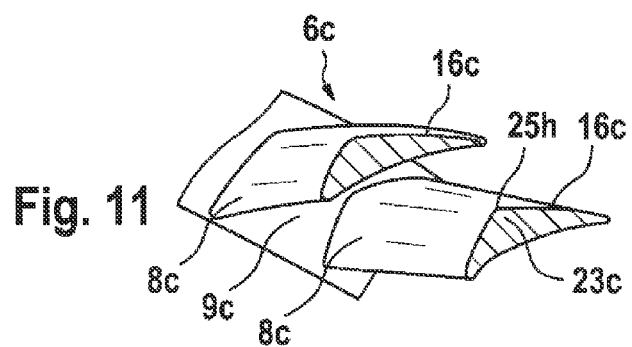

The effect of the thickening is a function of its configuration over the diameter. FIGS. 9 through 11 show detail illustrations of different embodiments of the convex profile 16a, 16b, 16c of advantageous embodiments of stators 6a, 6b, 6c with blades 8a, 8b, 8c configured differently over their radial extension. FIG. 9 shows a detail of the stator 6a with blades 8a, whose convex profile 16a comprises a thickening with an edge 25f at the radial inner diameter at the stator hub 9a, which regresses into a conventional convex profile in radial direction towards the outer diameter by continuously reducing the thickening 23a and the edge 25f. To the contrary, FIG. 10 shows a blade 8b with a conventionally configured convex profile 16b at the stator hub 9b, which establishes a continuously increasing thickening 23b with an edge 25g in radially outward direction up to the outer circumference. FIG. 11 shows a convex profile 16c with a thickening 23c and an edge 25h over the entire radial extension of the blade 8c from the stator hub 9c to the outer circumference.

Thus, it is seen that the objects of the present invention are efficiently obtained, although modifications and changes to the invention should be readily apparent to those having ordinary skill in the art, which modifications are intended to be within the spirit and scope of the invention as claimed. It also is understood that the foregoing description is illustrative of the present invention and should not be considered as limiting. Therefore, other embodiments of the present invention are possible without departing from the spirit and scope of the present invention.

REFERENCE NUMERALS AND DESIGNATIONS 1 hydrodynamic torque converter
2 housing
3 pump
4 turbine
5 turbine hub
6 stator
6a stator
6b stator 6c stator
7 freewheeling clutch
8 blade
8a blade
8b blade
8c blade
9 stator hub
9a stator hub
9b stator hub
9c stator hub
10 race
11 leading edge
12 trailing edge
13 meridional length
14 exterior diameter
15 interior diameter
16 convex profile
16a convex profile
16b convex profile
16c convex profile
17 convex profile
18 camber line
19 arrow
20 arrow
21 tangent
22 blade angle
22a blade angle
22b blade angle
22c blade angle
22d blade angle
22e blade angle
23 thickening
24 camber increase
25 edge
25a edge
25b edge
25c edge
25d edge
25e edge
25f edge
25h edge
26 arm
27 arm
A initial portion
B center portion
$d_1$ thickness
$d_2$ thickness
$d_3$ thickness
$d_4$ thickness
SR speed ratio
T1 torque curve
T2 torque curve

What I claim is:

1. A hydrodynamic torque (1) converter comprising:
a pump (3);
a turbine (4) driven by the pump; and,
a stator (6, 6a, 6b, 6c) disposed between the pump and the turbine and supported by a housing of the torque converter in one direction of rotation by a freewheeling clutch (7), the stator comprising a plurality of blades (8, 8a, 8b, 8c) extending between an inner diameter of a stator hub (9, 9a, 9b, 9c) and an outer diameter (14) of the stator (6, 6a, 6b, 6c), wherein each blade has a concave profile (17) between a leading edge (11) and a trailing edge (12) at a pressure side and a convex profile (16, 16a, 16b, 16c) at a suction side, wherein:

the convex profile (16, 16a, 16b, 16c) includes an overly-proportional camber relative to the concave profile (17) in a center portion (B) along a meridional length (13) between the leading edge (11) and the trailing edge (12);
the blades (8a) at an inner diameter comprise a blade angle distribution with increased thickness in the center portion (B); and,
the overly-proportional camber of the center portion (B) regresses to a proportional camber of the convex profile with increasing diameter.

2. The hydrodynamic torque converter (1) according to claim 1, wherein the center portion (B) is disposed at 30% to 80% of the meridional length (13) starting at the leading edge (11).

3. The hydrodynamic torque converter (1) according to claim 1, wherein the center portion (B) is disposed at 40% to 70% of the meridional length (13) measured from the leading edge (11).

4. The hydrodynamic torque converter (1) according to claim 1, wherein a blade angle (22, 22a, 22b, 22c, 22d) of a camber line (18) of an initial portion (A) between the leading edge (11) and the center portion (B) varies by 0° to ±20°.

5. The hydrodynamic torque converter (1) according to claim 1, wherein a blade angle (22, 22a, 22b, 22c, 22d) of a camber line (18) of the center portion (B) varies from a beginning of the center portion (B) between 30° and 90°.

6. The hydrodynamic torque converter (1) according to claim 1, wherein an initial blade angle (22, 22a, 22b, 22c, 22d) of a camber line (18) in the center portion is between 70° and 110° in the center portion (B).

7. The hydrodynamic torque converter (1) according to claim 1, wherein a gradient of a blade angle (22, 22a, 22b, 22c, 22d) of a camber line (18) in an initial portion (A) between the leading edge (11) and the center portion (B) is between −0.5° and +0.5° per percent of length increase of the meridional length (13).

8. The hydrodynamic torque converter (1) according to claim 1, wherein a gradient of a blade angle (22, 22a, 22b, 22c, 22d) in the center portion (B) is greater or equal 1.5° per percent of length increase of the meridional length (13).

9. The hydrodynamic torque converter (1) according to claim 1, wherein the center portion is provided over an entire diameter of each of the blades (8c).

10. The hydrodynamic torque converter (1) according to claim 1, wherein the blades (8b) at an outer diameter comprise a blade angle distribution with increased thickness in the center portion (B), wherein the overly-proportional camber of the center portion (B) regresses to a proportional camber of the convex profile with decreasing diameter.

11. A hydrodynamic torque (1) converter comprising:
a pump (3);
a turbine (4) driven by the pump; and,
a stator (6, 6a, 6b, 6c) disposed between the pump and the turbine and supported by a housing of the torque converter in one direction of rotation by a freewheeling clutch (7), the stator comprising a plurality of blades (8, 8a, 8b, 8c) extending in an uninterrupted manner between an outer diameter of a stator hub (9, 9a, 9b, 9c) and a portion of the stator including a radially outer diameter (14) of the stator (6, 6a, 6b, 6c), wherein:
each blade has a concave profile (17) between a leading edge (11) and a trailing edge (12) at a pressure side and a convex profile (16, 16a, 16b, 16c) at a suction side;
the convex profile (16, 16a, 16b, 16c) includes an overly-proportional camber relative to the concave profile

(17) in a center portion (B) along a meridional length (13) between the leading edge (11) and the trailing edge (12);

the leading edge and the trailing edge are each continuous from the outer diameter of the stator hub to the portion of the stator including the radially outer diameter;

the blades (8b) at an outer diameter comprise a blade angle distribution with increased thickness in the center portion (B); and, the overly-proportional camber of the center portion (B) regresses to a proportional camber of the convex profile with decreasing diameter.

12. A hydrodynamic torque (1) converter comprising:

a pump (3);

a turbine (4) driven by the pump; and, a stator (6, 6a, 6b, 6c) disposed between the pump and the turbine and supported by a housing of the torque converter in one direction of rotation by a freewheeling clutch (7), the stator comprising a plurality of blades (8, 8a, 8b, 8c) extending in an uninterrupted manner between an outer diameter of a stator hub (9, 9a, 9b, 9c) and a portion of the stator including a radially outer diameter (14) of the stator (6, 6a, 6b, 6c), wherein:

each blade has a concave profile (17) between a leading edge (11) and a trailing edge (12) at a pressure side and a convex profile (16, 16a, 16b, 16c) at a suction side;

the convex profile (16, 16a, 16b, 16c) includes an overly-proportional camber relative to the concave profile (17) in a center portion (B) along a meridional length (13) between the leading edge (11) and the trailing edge (12);

the leading edge and the trailing edge are each continuous from the outer diameter of the stator hub to the portion of the stator including the radially outer diameter; and, the center portion (B) is disposed at 30% to 80% of the meridional length (13) starting at the leading edge (11).

\* \* \* \* \*